United States Patent [19]

Schilling

[11] Patent Number: 5,655,883
[45] Date of Patent: Aug. 12, 1997

[54] HYBRID BLADE FOR A GAS TURBINE

[75] Inventor: Jan Christopher Schilling, Middletown, Ohio

[73] Assignee: General Electric Company, Schenectady, N.Y.

[21] Appl. No.: 533,479

[22] Filed: Sep. 25, 1995

[51] Int. Cl.⁶ ............................................. F01D 5/14
[52] U.S. Cl. ........................... 416/229 A; 416/241 A; 416/230
[58] Field of Search ..................... 416/241 A, 229 R, 416/229 A, 230, 232

[56] References Cited

U.S. PATENT DOCUMENTS

| | | | |
|---|---|---|---|
| 3,637,325 | 1/1972 | Morley | 416/241 A |
| 3,695,778 | 10/1972 | Taylor . | |
| 3,903,578 | 9/1975 | Rothman . | |
| 4,118,147 | 10/1978 | Ellis . | |
| 4,594,761 | 6/1986 | Murphy et al. . | |
| 4,643,647 | 2/1987 | Perry | 416/230 |
| 5,145,320 | 9/1992 | Blake et al. | 416/230 |
| 5,295,789 | 3/1994 | Daguet | 416/241 A |
| 5,429,877 | 7/1995 | Eylon | 416/232 |

FOREIGN PATENT DOCUMENTS

| | | | |
|---|---|---|---|
| 0162457 | 5/1904 | Germany | 416/232 |
| 0157310 | 12/1979 | Japan | 416/230 |
| 1186486 | 10/1968 | United Kingdom | 416/230 |
| 1268202 | 3/1972 | United Kingdom | 416/230 |
| 2272731 | 5/1994 | United Kingdom | 416/232 |

*Primary Examiner*—Edward K. Look
*Assistant Examiner*—Mark Sgantzos
*Attorney, Agent, or Firm*—Douglas E. Erickson; Marvin Snyder

[57] ABSTRACT

A lightweight, impact-resistant gas turbine blade, such as an aircraft engine fan blade, includes attached-together first-metal and second-composite segments together defining an airfoil portion. The first segment includes entirely the suction side, leading edge, and trailing edge from the blade root to the blade tip and further includes partially the pressure side near the leading and trailing edges from the blade root to the blade tip. The second segment includes partially the pressure side from near the leading edge to near the trailing edge from the blade root to near the blade tip.

8 Claims, 2 Drawing Sheets

HYBRID BLADE FOR A GAS TURBINE

BACKGROUND OF THE INVENTION

The present invention relates generally to gas turbines, and more particularly to a hybrid metallic/composite blade for a gas turbine.

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive the front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have gas turbine blades each including an airfoil portion attached to a shank portion. Rotor blades are those gas turbine blades which are attached to a rotating gas turbine rotor disc. Stator vanes are those gas turbine blades which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known. Conventional gas turbine blade designs typically have airfoil portions that are made entirely of metal, such as titanium, or are made entirely of a composite. A "composite" is defined to be a material having any (metal or non-metal) fiber filament embedded in any (metal or non-metal) matrix binder, but the term "composite" does not include a metal fiber embedded in a metal matrix. The term "metal" includes an alloy. An example of a composite is a material having graphite filaments embedded in an epoxy resin. The all-metal blades, including costly wide-chord hollow blades, are heavier in weight which results in lower fuel performance and which requires sturdier blade attachments, while the lighter all-composite blades suffer more response/damage from bird strikes. Known hybrid blades include a composite blade whose leading edge is protected by metal for erosion and bird impact reasons. The fan blades typically are the largest (and therefore the heaviest) blades in a gas turbine aircraft engine, and the front fan blades are the first to be impacted by a bird strike. What is needed is a gas turbine blade, and especially a gas turbine fan blade, which is both lighter in weight and better resistant to damage from bird strikes.

SUMMARY OF THE INVENTION

It is an object of the invention to provide a hybrid metallic/composite gas turbine blade.

The gas turbine blade of the invention includes a shank portion and attached-together first and second segments. The first and second segments together define a solid airfoil portion. The airfoil portion has a leading edge, a trailing edge, a pressure side, a suction side, a blade root, a blade tip, and a radial axis. The sides are joined together at the edges to define an airfoil shape. The blade root is attached to the shank portion, and the radial axis extends outward toward the blade tip and inward toward the blade root. The first segment consists essentially of a metal material and the second segment consists essentially of a filament composite material. The first segment includes entirely the suction side, the leading edge, and the trailing edge from the blade root to the blade tip, and the first segment further includes partially the pressure side near the leading edge and near the trailing edge from the blade root to the blade tip. The second segment includes partially the pressure side from near the leading edge to near the trailing edge from the blade root to near the blade tip. Preferably, the airfoil portion is an airfoil portion of a gas turbine aircraft engine fan blade.

Several benefits and advantages are derived from the gas turbine blade of the invention. The first segment of the blade's airfoil portion, consisting essentially of a metal material, provides resistance to damage from bird strikes in those areas of the blade, such as an aircraft fan blade, most prone to bird strike impact damage. The second segment of the blade's airfoil portion, consisting essentially of a composite material, provides low weight in those areas of the blade, such as an aircraft fan blade, least prone to bird strike impact damage. Such second segment is also easily repairable.

BRIEF DESCRIPTION OF THE DRAWINGS

The accompanying drawings illustrate a preferred embodiment of the present invention wherein.

DETAILED DESCRIPTION OF THE INVENTION

Figure 1:
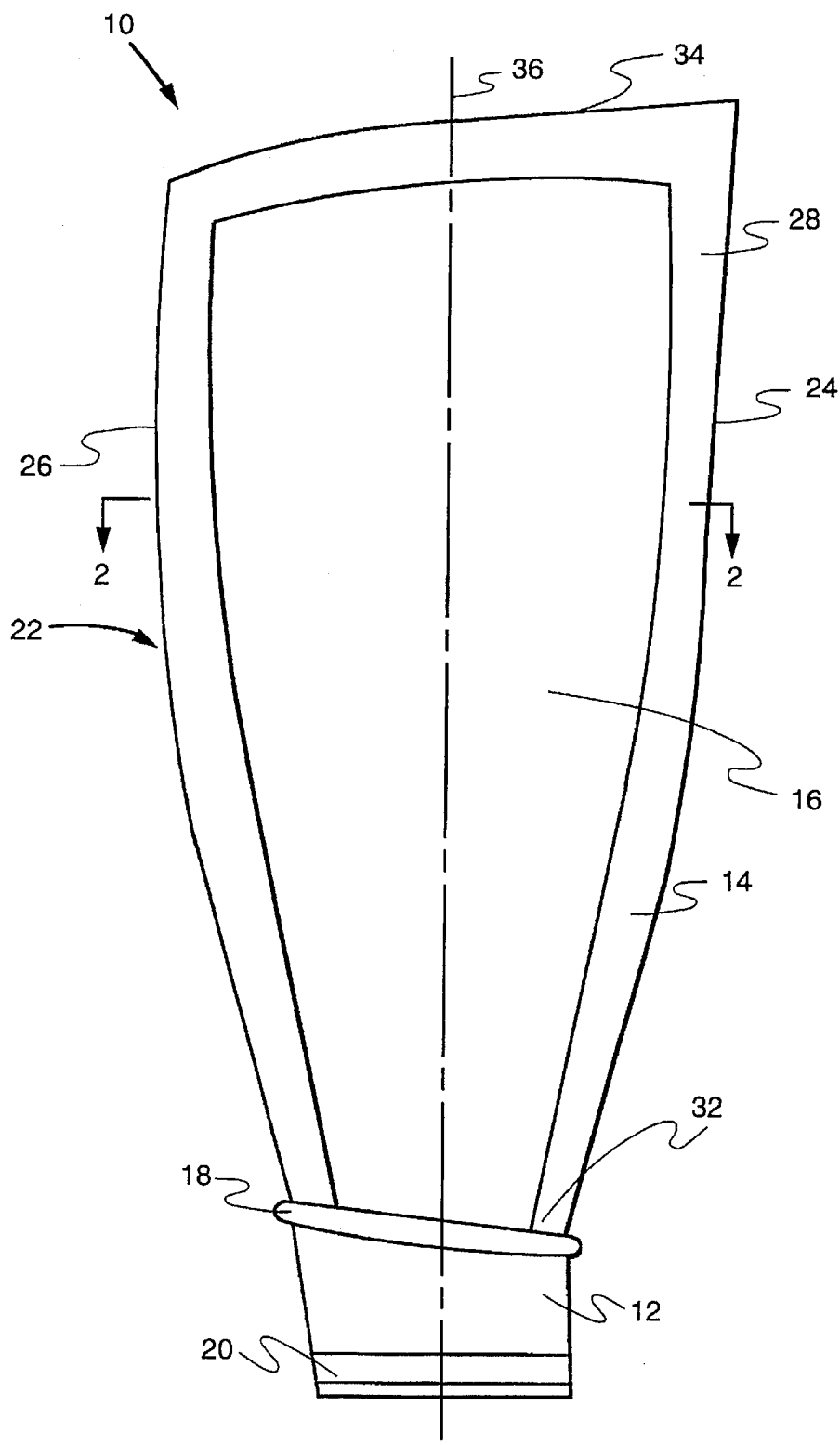
FIG. 1 is a schematic side-elevational view of a preferred gas turbine aircraft engine fan blade embodiment of the gas turbine blade of the present invention.
Figure 2:
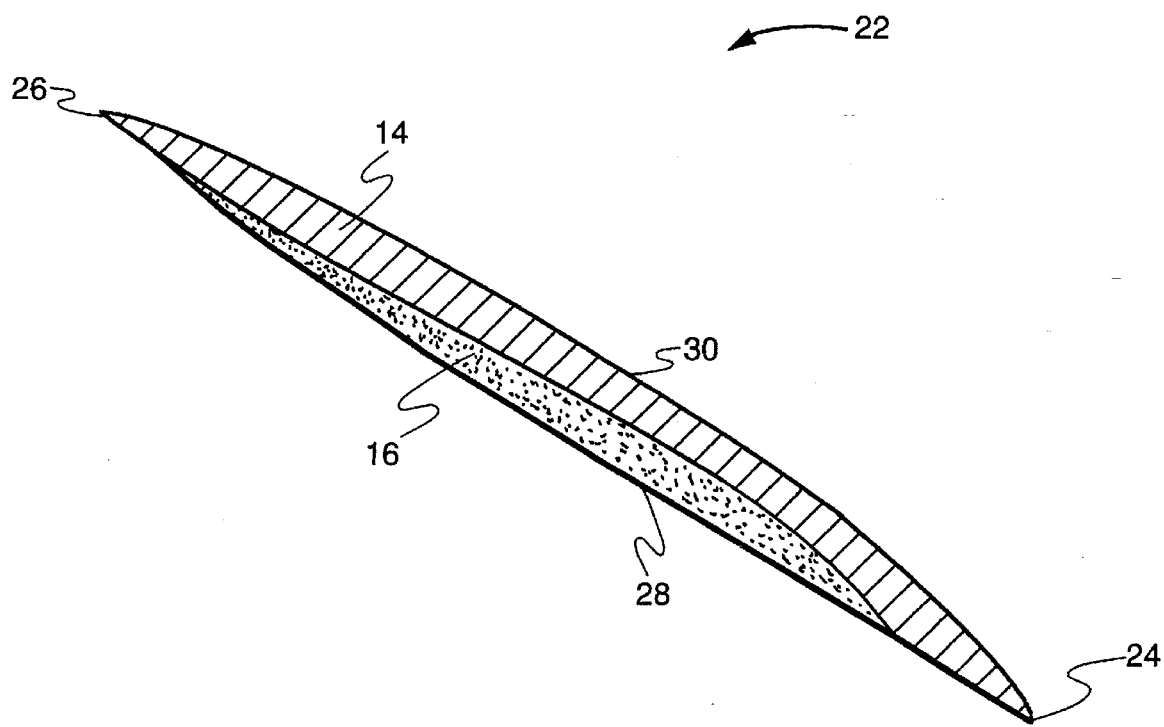
FIG. 2 is a schematic view of the airfoil portion of the gas turbine blade of FIG. 1, taken along lines 2—2 of FIG. 1.

Referring now to the drawings, wherein like numerals represent like elements throughout, FIGS. 1 and 2 schematically show a first preferred embodiment of the gas turbine blade 10 of the present invention. The gas turbine blade 10 includes a shank portion 12 and attached-together first and second segments 14 and 16. Typically, the shank portion 12 has a blade platform 18, which helps to radially contain the air flow, and a dovetail 20, which attaches to a rotor disc (not shown). The first and second segments 14 and 16 together define a solid airfoil portion 22.

The airfoil portion 22 has a leading edge 24, a trailing edge 26, a pressure (concave-shaped) side 28, a suction (convex-shaped) side 30, a blade root 32, a blade tip 34, and a radial axis 36. The sides 28 and 30 are joined together at the edges 24 and 26 to define an airfoil shape. The blade root 32 is attached to the shank portion 12. The radial axis 36 extends outward toward the blade tip 34 and inward toward the blade root 32.

The first segment 14 consists essentially of a metal material, and preferably consists of a metal material. The term "metal" includes an alloy. Preferably, the first segment 14 is a monolithic metal segment. In an exemplary embodiment, the metal material consists essentially of (and preferably consists of) titanium. Other choices for the metal material include, but are not limited to, aluminum, cobalt, nickel, or steel. The first segment 14 includes entirely the suction side 30, entirely the leading edge 24, and entirely the trailing edge 26 all from the blade root 32 to the blade tip 34. The first segment 14 further includes partially the pressure side 28 proximate the leading edge 24 and proximate the trailing edge 26 all from the blade root 32 to the blade tip 34. Preferably, for better tip-rub protection, the first segment 14 includes entirely the blade tip 34 and further includes partially the pressure side 28 proximate the blade tip 34 from the leading edge 24 to the trailing edge 26.

The second segment 16 consists essentially of a composite material, and preferably consists of a composite material. The term "composite" is defined to be a material having any (metal or non-metal) fiber filament embedded in any (metal or non-metal) matrix binder, but the term "composite" does not include a metal fiber (i.e., fiber filament) embedded in a metal matrix. Preferably, the second segment 16 is a layup of discrete composite laminations. In an exemplary embodiment, the composite material consists essentially of (and preferably consists of) carbon fiber filaments embedded in an epoxy (i.e., epoxy resin) matrix binder. Other choices for the composite material include, but are not limited to, fiber-bismaleimide, fiber-polyimide, and other fiber-epoxy thermoset or thermoplastic resins and mixtures thereof. The second segment 16 includes partially the pressure side 28 from proximate the leading edge 24 to proximate the trailing edge 26 from the blade root 32 to proximate the blade tip 34. Fiber-filament modulus and orientation are chosen to maintain overall, airfoil-portion stiffness to minimize structural binding of the blade under centrifugal and aerodynamic load, as is within the level of skill of the artisan.

The gas turbine blade 10 rotates in a direction such that the pressure (concave) side 28 passes a reference point before the suction (convex) side 30 passes the same reference point. Thus, the bird impact footprint is primarily over the metallic-first-segment 14 area of the pressure side 28 near the leading edge 24, followed by the adjoining composite-second-segment 16 area of the pressure side 28. Such composite area provides buckling resistance since it will be in tension, which is best for composites. The following percentages of second-segment composite material making up the airfoil portion 22 have been determined by engineering analysis through optimizing weight and impact resistance factors.

Preferably, the second segment 16 includes between generally forty and ninety percent (and desirably between fifty and eighty percent) of the surface area of the pressure side 28 and includes between generally forty and ninety percent (and desirably between fifty and eighty percent) of the volume size of the airfoil portion 22. In an exemplary enablement, the second segment 16 includes generally seventy percent of the surface area of the pressure side 28 and includes generally seventy percent of the volume size of the airfoil portion 22. In a preferred embodiment, the surface area of the second segment 16 on the pressure side 28 is encompassed by a single closed figure and the volume of the second segment 16 is encompassed by a single closed solid.

It is preferred that the second segment 16 extend in a general chordwise direction along the pressure side 28 between generally fifteen and ninety-five percent (and desirably between fifty and eighty percent) of the distance along the pressure side 28 between the leading edge 24 and the trailing edge 26. In a preferred embodiment, the second segment 16 extends generally sixty percent of the distance along the pressure side 28 between the leading edge 24 and the trailing edge 26. It is desired that the second segment 16 extend radially between generally sixty and ninety-five percent (and preferably between generally seventy and ninety-five percent) of the distance between the blade root 32 and the blade tip 34. In an exemplary embodiment, the second segment 16 extends radially generally ninety percent of the distance between the blade root 32 and the blade tip 34.

In a favored enablement, the composite material is thermally removable from the first segment 14 at a temperature below the melting point of the metal material. This allows the airfoil portion 22 to be easily repairable should it become damaged due to bird strikes or foreign object impacts. If the airfoil portion is damaged in the composite second segment 16, the composite material would be thermally removed, the metal first segment 14 repaired, and new composite material reapplied. Since most of such blade damage is to the lead row of gas turbine blades 10, it is preferred that the airfoil portion 22 is an airfoil portion of a gas turbine aircraft engine fan blade 10 (or the airfoil portion of a gas turbine aircraft engine compressor blade if the engine has no fan). Engineering analysis has shown that the gas turbine blade 10 of the present invention, in the form of a gas turbine aircraft engine fan blade, has a preferred diameter of between generally 45 and 98 inches and a preferred design maximum speed at the blade tip 34 of less than generally 1550 feet per second. Such preferred operating conditions ensure that the blade tip temperature will not exceed the operating temperature of composite materials, such as epoxy, bismaleimide, and polyimide resins, used in the second segment 16 of the airfoil portion 22.

Preferred methods for making the gas turbine blade 10 of the invention include, but are not limited to, autoclave, compression mold, and resin transfer molding. If autoclave is chosen, the metal first segment 14 would act as one side of the tool, thus minimizing tooling. As previously mentioned, fiber-filament modulus and orientation would be chosen to maintain overall airfoil-portion stiffness to minimize structural binding of the blade under centrifugal and aerodynamic load, as is within the level of skill of the artisan.

It is noted that the dovetail 20 of the shank portion 12 can be partially composite on the pressure (concave) side (not shown). Alternatively, the dovetail 20 can have a metal wedge system (also not shown) to positively capture the composite second segment 16 and provide a metallic dovetail wear surface. It is further noted that less containment structure for the airfoil portion 22 is required since the composite material will fragment and disband from the metallic first segment 14 under impact.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

I claim:

1. A gas turbine aircraft engine fan blade comprising: a shank portion and attached-together first and second segments, said first and second segments together defining a solid rotatable airfoil portion, and said airfoil portion having:

a) a leading edge;

b) a trailing edge;

c) a pressure side;

d) a suction side, said sides joined together at said edges to define an airfoil shape;

e) a blade root attached to said shank portion;

f) blade tip; and g) a radial axis extending outward toward said blade tip and inward toward said blade root;

wherein said first segment consists essentially of a metal material, said first segment including entirely said suction side, entirely said leading edge, and entirely said trailing edge all from said blade root to said blade tip, and said first segment further including partially said pressure side proximate said leading edge and proximate said trailing edge all from said blade root to said blade tip, wherein said second segment consists essentially of a composite material, said second segment including partially said pressure side from proximate said leading edge to proximate said trailing edge from said blade root to proximate said blade tip.

wherein the surface area of the second segment on said pressure side is encompassed by a single closed figure, and wherein the volume of the second segment is encompassed by a single closed solid.

2. The gas turbine blade of claim 1, wherein said first segment includes entirely said blade tip and further includes partially said pressure side proximate said blade tip from said leading edge to said trailing edge.

3. The gas turbine blade of claim 1, wherein said second segment includes between generally forty and ninety percent of the surface area of said pressure side and between generally forty and ninety percent of the volume of said airfoil portion.

4. The gas turbine blade of claim 1, wherein said second segment extends in a general chordwise direction along said pressure side between generally forty and ninety percent of the distance along said pressure side between said leading edge and said trailing edge and wherein said second segment extends radially between generally sixty and ninety-five percent of the distance between said blade root and said blade tip.

5. The gas turbine blade of claim 1, wherein said metal material consists essentially of titanium and wherein said composite material consists essentially of carbon fiber filaments embedded in an epoxy matrix binder.

6. The gas turbine blade of claim 1, wherein said composite is thermally removable from said airfoil portion at a temperature below the melting point of said metal.

7. The gas turbine blade of claim 1, wherein said aircraft engine fan blade has a diameter of between generally 45 and 98 inches.

8. The gas turbine blade of claim 7, wherein said aircraft engine fan blade has a design maximum speed at said blade tip of less than generally 1550 feet per second.

* * * * *